US008195677B2

(12) United States Patent
Sako et al.

(10) Patent No.: US 8,195,677 B2
(45) Date of Patent: Jun. 5, 2012

(54) RECORDING MEDIUM, RECORDING DEVICE, RECORDING METHOD, DATA SEARCH DEVICE, DATA SEARCH METHOD, AND DATA GENERATING DEVICE

(75) Inventors: Yoichiro Sako, Tokyo (JP); Toshiro Terauchi, Tokyo (JP); Kosei Yamashita, Kanagawa (JP); Motoyuki Takai, Tokyo (JP); Yasushi Miyajima, Kanagawa (JP); Toru Sasaki, Tokyo (JP); Yuichi Sakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 525 days.

(21) Appl. No.: 11/264,734

(22) Filed: Nov. 1, 2005

(65) Prior Publication Data
US 2006/0112071 A1    May 25, 2006

(30) Foreign Application Priority Data

Nov. 1, 2004 (JP) ................................ P2004-317511

(51) Int. Cl.
*G06F 17/30* (2006.01)
(52) U.S. Cl. ...................................................... 707/758
(58) Field of Classification Search ............... 707/1, 607, 707/726, 758, 707
See application file for complete search history.

(56) References Cited

U.S. PATENT DOCUMENTS

| 6,526,400 | B1 * | 2/2003 | Takata et al. ................ 707/3 |
| 7,022,905 | B1 * | 4/2006 | Hinman et al. .............. 84/609 |
| 7,308,413 | B1 * | 12/2007 | Tota et al. .................... 705/7 |
| 2002/0041692 | A1 * | 4/2002 | Seto et al. ................... 381/86 |
| 2003/0016254 | A1 * | 1/2003 | Abe ............................ 345/864 |
| 2003/0037041 | A1 * | 2/2003 | Hertz .......................... 707/1 |
| 2003/0060728 | A1 * | 3/2003 | Mandigo .................... 600/545 |
| 2004/0003706 | A1 * | 1/2004 | Tagawa et al. .............. 84/609 |
| 2004/0206228 | A1 * | 10/2004 | Suzuki et al. ............... 84/615 |
| 2004/0267736 | A1 * | 12/2004 | Yamane et al. .............. 707/3 |
| 2005/0091278 | A1 * | 4/2005 | Wang ......................... 707/104.1 |

FOREIGN PATENT DOCUMENTS

| JP | 01-217783 | 8/1989 |
| JP | 05257487 A | 10/1993 |
| JP | 06-110478 A | 4/1994 |
| JP | 2624969 B2 | 4/1997 |
| JP | 2664395 | 6/1997 |
| JP | 2002-182660 | 6/2002 |
| JP | 3450020 B2 | 7/2003 |
| JP | 2003-316925 | 11/2003 |

(Continued)

OTHER PUBLICATIONS

Morisawa, Yoshihito; Music database using fuzzy theory; The Information Processing Society of Japan National Convention Lecture Memoirs; Mar. 15, 1989; p. 1862; vol. 38, No. 3; Japan.

(Continued)

*Primary Examiner* — Angela Lie
*Assistant Examiner* — Fatima Mina
(74) *Attorney, Agent, or Firm* — Wolf, Greenfield & Sacks, P.C.

(57) ABSTRACT

A data search device includes a playback unit playing back subjective data representing a subjectivity for predetermined content data from a recording medium on which the subjective data is recorded in association with the content data; a receiving unit receiving subjective data input by a user; and a searching unit searching for the content data in accordance with the subjective data played back by the playback unit and the subjective data received by the receiving unit.

4 Claims, 10 Drawing Sheets

FOREIGN PATENT DOCUMENTS

JP          2003-316925 A     11/2003

OTHER PUBLICATIONS

Chinese Office Action issued Jul. 4, 2008 in Chinese Application No. 2005101192476.

Chinese Office Action issued Aug. 28, 2009 in Chinese Application No. 2005101192476.

Chinese Office Action issued Dec. 26, 2009 in Chinese Application No. 2005101192476.

* cited by examiner

RECORDING MEDIUM, RECORDING DEVICE, RECORDING METHOD, DATA SEARCH DEVICE, DATA SEARCH METHOD, AND DATA GENERATING DEVICE

CROSS REFERENCES TO RELATED APPLICATIONS

The present invention contains subject matter related to Japanese Patent Application JP 2004-317511 filed in the Japanese Patent Office on Nov. 1, 2004, the entire contents of which are incorporated herein by reference.

BACKGROUND OF THE INVENTION

1. Field of the Invention

The present invention relates to recording media, recording devices, recording methods, data search devices, data search methods, and data generating devices.

2. Description of the Related Art

Hard disk drives have a capacity extremely larger than that of compact disk read-only memories (CD-ROMs), memory cards, and the like. Motion picture experts group-1 (MPEG-1) audio layer 3 (MP3) and the like are available as technologies for data-compressing digital audio signals of music. A digital audio signal can be compressed to less than one tenth of its original size by such technologies.

Thus, when hard disk drives are used as recording media on which compressed music data is recorded and stored, many pieces of music can be stored. For example, in a case where a hard disk drive has a capacity of 100 gigabytes, when each piece of music is three minutes long, about 3,700 pieces of music can be stored without compression, and about 37,000 pieces of music can be stored with data compression.

Known technologies are disclosed, for example, in Japanese Unexamined Patent Application Publication Nos. 2004-13653 and 2004-46575.

SUMMARY OF THE INVENTION

However, if, as described above, several thousands or several tens of thousands of pieces of music are stored in a recording medium, selecting a piece of music suitable for the feeling of a listener (user) and the atmosphere at that moment from among the stored pieces of music is difficult. For example, when the listener wants to listen to upbeat music, the listener remembers a title of a piece of upbeat music. The piece of upbeat music corresponding to the remembered title is searched for and played back. In such a method, however, the listener can remember only a limited number of titles. Thus, even if there are many corresponding pieces of music, the listener may be able to listen to only a few pieces of music. In addition, if the listener does not remember a title correctly, a piece of music not suitable for the feeling at that moment may be played back.

In order to solve the above-mentioned problems, a data search device according to an embodiment of the present invention includes playback means for playing back subjective data representing a subjectivity for predetermined content data from a recording medium on which the subjective data is recorded in association with the content data; receiving means for receiving subjective data input by a user; and searching means for searching for the content data in accordance with the subjective data played back by the playback means and the subjective data received by the receiving means.

Accordingly, when a listener (user) inputs subjective data, a piece of music suitable for the feeling of the listener and the atmosphere at that moment is selected and played back. In such a case, since the listener does not have to remember a title of a piece of music, even if the listener does not know a title of a corresponding piece of music or even if there are many corresponding pieces of music, the listener is able to listen to a piece of music suitable for the feeling of the listener and the atmosphere at that moment.

DESCRIPTION OF THE PREFERRED EMBODIMENTS

Figure 1:
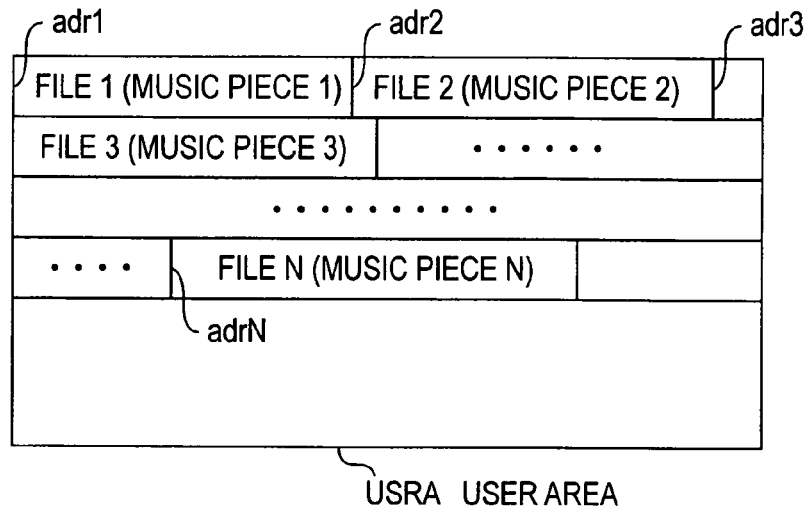
FIG. 1 shows an example of a recording format according to an embodiment of the present invention.

FIGS. 1A to 1C show an example of a recording format when a hard disk drive is used as a recording medium. In other words, as shown in FIG. 1A, digital audio data for music pieces 1 to N is recorded as files 1 to N in a user area USRA of the hard disk drive. In this case, the digital audio data in the files 1 to N is data-compressed, for example, in an MP3 format. Reference marks adr1 to adrN represent start addresses of clusters (cluster numbers) in which the files 1 to N are recorded.

In addition, a title table TTBL, which is shown, for example, in FIG. 1B, is stored in the hard disk drive. The title table TTBL represents the relationships between titles ttl1 to ttlN of the music pieces 1 to N recorded in the user area USRA and the start addresses adr1 to adrN of the files 1 to N in the user area USRA.

In addition, a subjective data table SBJT, which is shown, for example, in FIG. 1C, is stored in the hard disk drive. The subjective data table SBJT represents the relationships between subjective data and tags (link pointers). A row (a pair) of the subjective data table SBJT corresponds to a piece of music recorded in the user area USRA.

The subjective data includes "impression representation languages" and "scene representation languages". An "impression representation language" represents an impression a listener (user) gets when listening to music, such as "upbeat", "refreshed", "serene", or "cheerful" or an impression the listener wants to get when listening to music, such as "wishing to feel upbeat", "wishing to feel refreshed", "wishing to feel serene", or "wishing to feel cheerful". One or more impression representation languages for a corresponding piece of music are provided in an impression representation language cell.

A "scene representation language" represents a scene or state where the listener is listening to music, such as "in the country", "with a loved one", "alone", "in the morning", "in summer", or "in a formal mood". One or more scene representation languages for a corresponding piece of music are provided in a scene representation language cell.

A tag associates subjective data in the subjective data table SBJT with a file of a piece of music in the user area USRA. In this example, the start addresses adr1 to adrN of the corresponding files 1 to N in the user area USRA serve as tags.

Thus, a piece of music in the user area USRA, a title in the title table TTBL, and subjective data in the subjective data table SBJT are associated with each other via a start address. For example, in the example shown in FIGS. 1A to 1C, a music piece 1 (file 1) is associated with a title ttl1 in the first row in the title table TTBL and subjective data "upbeat, ..." and "in the country, ..." in the first row of the subjective data table SBJT via a start address adr1.

Figure 2:
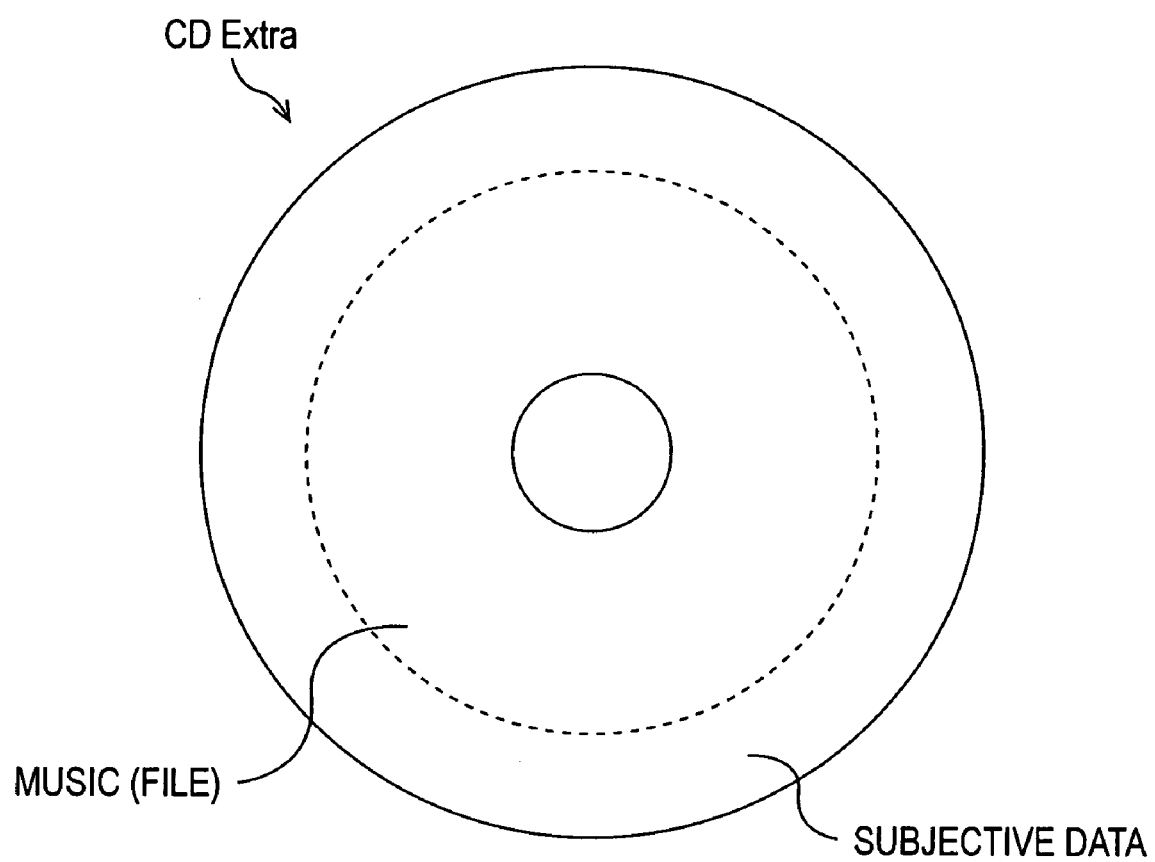
FIG. 2 shows another example of a recording format.

Subjective data for a piece of music can be acquired in accordance with a questionnaire survey made to a plurality of listeners by a label company. When a label company sells a compact disk (CD) containing a piece of music, for example, the CD is in the CD Extra format in which music is stored in the first session and a title and subjective data are stored in the second session, as shown in FIG. 2. Alternatively, a title and subjective data may be included in a table of contents (TOC) of the CD or may be included in a text portion of a CD text as part of fringe data.

Accordingly, music, a title, and subjective data contained in a CD can be moved to and used in the above-described hard disk drive. Alternatively, such a CD itself may be handled in a similar way to the above-described hard disk drive.

In addition, a pair of title and subjective data of a piece of music can be distributed via the Internet or a homepage to a listener who has already purchased the piece of music.

Figure 3:
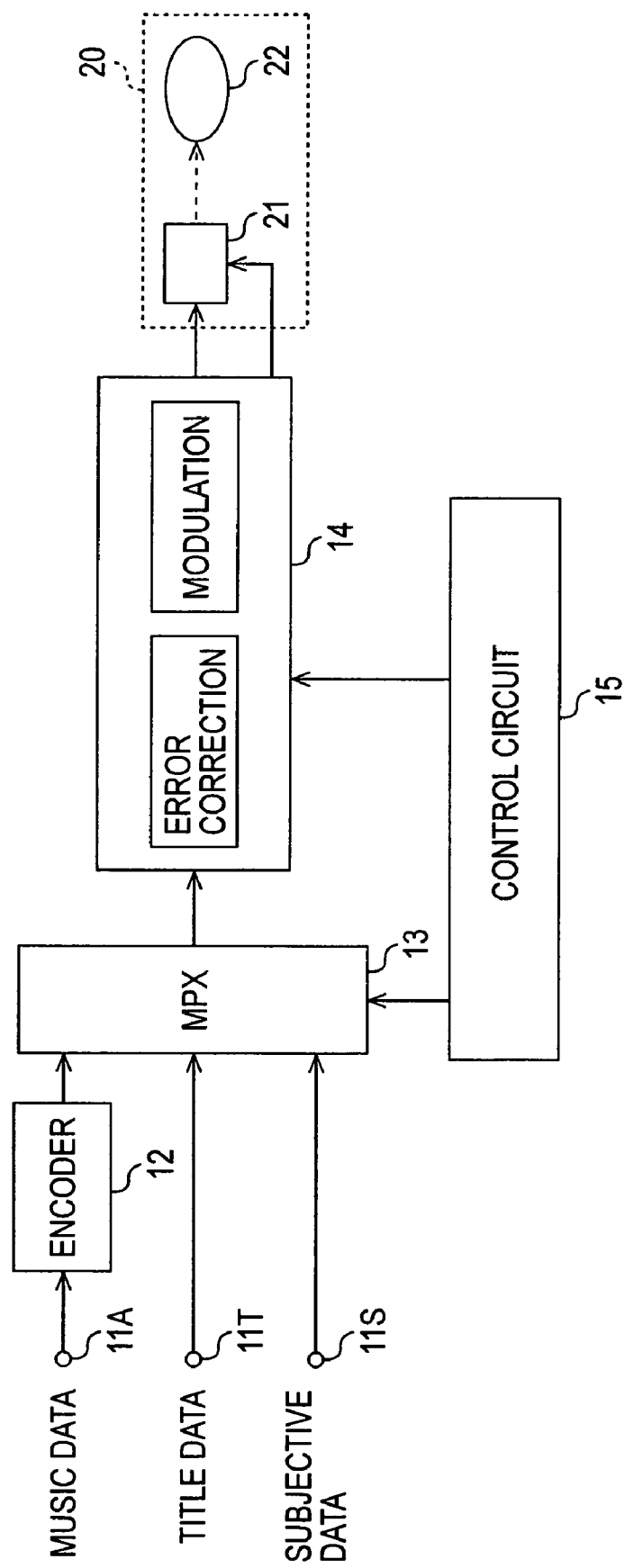
FIG. 3 is a schematic diagram showing an example of a recording device.

FIG. 3 shows an example of a recording device. In this example, the hard disk drive described with reference to FIGS. 1A to 1C is used as a recording medium. In other words, digital audio data of a piece of music is supplied via an input terminal 11A to an MP3 encoder 12 and encoded into MP3 digital data. The encoded MP3 digital data is supplied via a multiplexer 13 to a hard disk controller 14. An output of the multiplexer 13 is subjected to error correction and modulation for recording by the hard disk controller 14, and then supplied to a magnetic head portion 21 of a hard disk drive 20.

In addition, in order to manage and control recording and playback of data in the hard disk drive 20, a control circuit 15 is formed by, for example, a microcomputer. The control circuit 15 supplies via the hard disk controller 14 to the magnetic head portion 21 a control signal designating a seek position on the magnetic head portion 21. Accordingly, the encoded output of the MP3 encoder 12 is recorded as a file in the user area USRA of a disk main unit 22 of the hard disk drive 20.

In addition, data of a title of the piece of music is supplied via an input terminal 11T to the multiplexer 13, and a recording start address when the piece of music is recorded on the disk main unit 22 is supplied from the control circuit 15 to the multiplexer 13. Accordingly, the data of the title and the start address are set as a pair of data. The pair of data is supplied to the hard disk controller 14, and recorded in the title table TTBL of the disk main unit 22 by the magnetic head portion 21.

In addition, subjective data of the piece of music is supplied from an input terminal 11S to the hard disk controller 14 via the multiplexer 13, and a recording start address when the piece of music is recorded on the disk main unit 22 is supplied from the control circuit 15 to the hard disk controller 14. Accordingly, the subjective data and the start address are set as a pair of data. The pair of data is supplied to the hard disk controller 14, and recorded in the subjective data table SBJT of the disk main unit 22 by the magnetic head portion 21.

As described above, as shown in FIGS. 1A to 1C, in the hard disk drive 20, a piece of music, a title, and subjective data are recorded in association with each other via a start address.

When a CD-recordable (CD-R) or the like is used as a recording medium, a similar recording device can be used. Alternatively, the subjective data table SBJT may be recorded in the CD Extra format.

Figure 4:
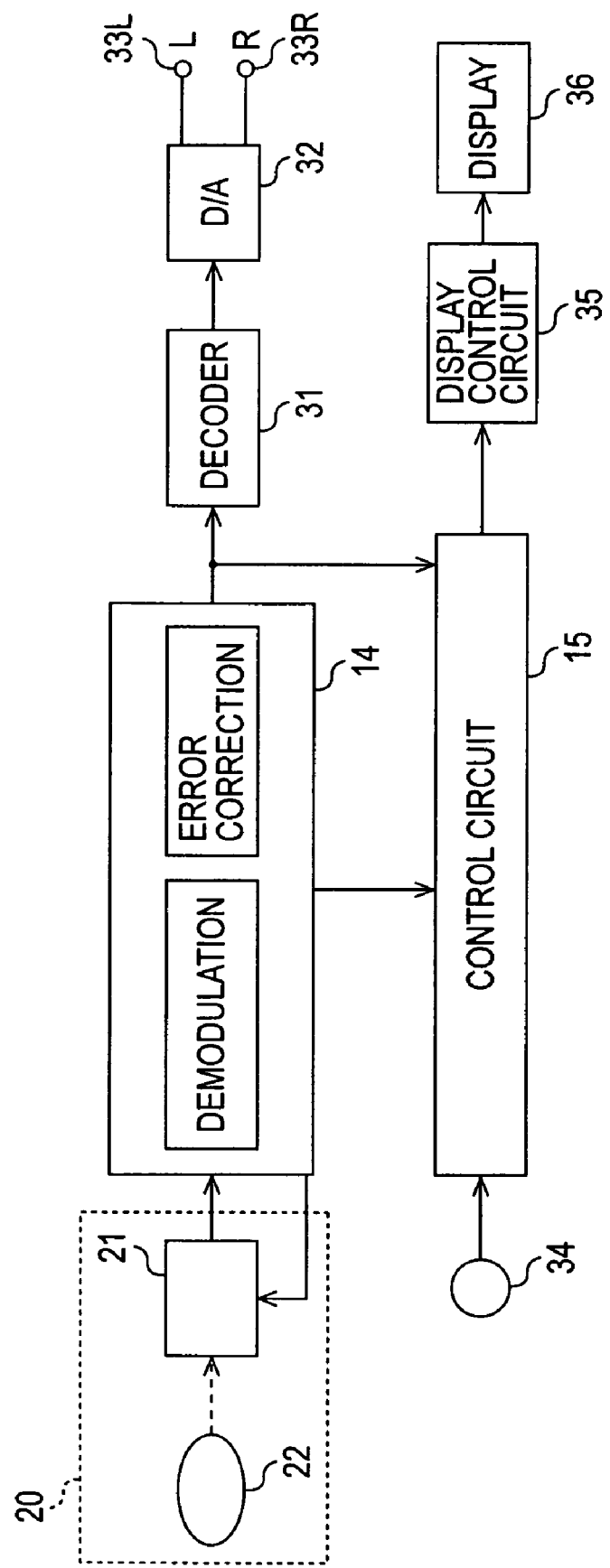
FIG. 4 is a schematic diagram showing an example of a playback device.

FIG. 4 shows an example of a playback device corresponding to the above-described recording device. In other words, a file of a desired piece of music is selected in accordance with a method described below from among files of a plurality of pieces of music recorded on the disk main unit 22, and the selected file is played back from the user area USRA by the magnetic head portion 21.

Data of the played back file is supplied to the hard disk controller 14 and is subjected to demodulation and error correction for playback. Then, the processed data is supplied to an MP3 decoder 31 to be decoded into original digital audio data and fringe data. The decoded digital audio data is supplied to a digital-to-analog (D/A) converter 32. The D/A converter 32 digital-to-analog converts the decoded digital audio data into analog audio signals L and R. Then, the audio signals L and R are extracted to output terminals 33L and 33R.

Figure 5:
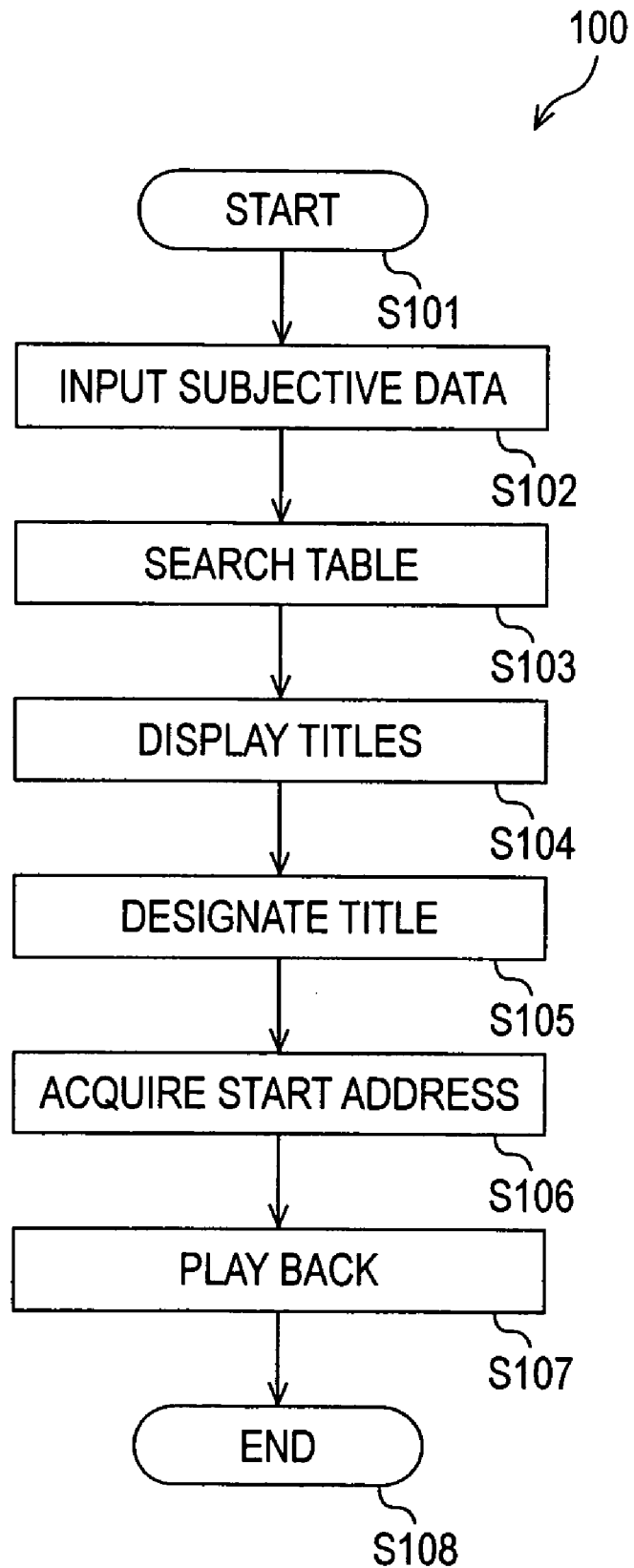
FIG. 5 is a flowchart showing an example of a playback process.

In this case, selection and playback of a piece of music recorded on the hard disk drive 20 is realized by a playback process 100 shown in FIG. 5 performed by the control circuit 15. In other words, when an instruction for playback is given via an operation key 34 (FIG. 4), the control circuit 15 starts the process 100 in step S101. Then, an input mode for subjective data is entered in step S102.

In the input mode for subjective data, a listener inputs an impression representation language and a scene representation language. In other words, predetermined display data is supplied from the control circuit 15 to a display control circuit 35 (FIG. 4), and various impression representation languages are displayed on a display 36 (FIG. 4). Then, the listener selects a language representing an impression the listener wants to get when listening to music from among the displayed impression representation languages. For example, when the listener wants to listen to upbeat music or wants to feel upbeat by listening to music, the listener selects "upbeat" when "upbeat", "refreshed", "serene", "cheerful", and so on are displayed as impression representation languages.

Then, various scene representation languages are displayed on the display 36. The listener selects a language representing a scene or state where the listener wants to listen to music from among the displayed scene representation languages. For example, when the listener wants to listen to music in the country, the listener selects "in the country" when the various scene representation languages are displayed.

When the foregoing selection is completed, processing for inputting subjective data ends. The process proceeds to step S103. In step S103, the subjective data table SBJT is searched using a language input by step S102 as a search term, and a tag (start address) corresponding to the selected language is extracted. If a selected language has a plurality of corresponding tags, all the corresponding tags are extracted.

Then, in step S104, the title table TTBL is searched using a tag extracted by step S103 as a search term, data of a title corresponding to the extracted tag is extracted, and the data of the extracted title is supplied to the display control circuit 35. Accordingly, titles of music corresponding to the selected impression representation language and scene representation language are displayed as a list on the display 36.

Then, a key input wait state is entered, and a title is designated using the operation key 34 in step S105. Then, in step S106, the title table TTBL is searched in accordance with data of the title designated in step S105, and a corresponding start address is extracted. Then, in step S107, a file designated by the start address acquired in step S106 is selected and played back from among the files 1 to N in the user area USRA, and audio signals L and R are extracted to the output terminals 33L and 33R, as described above. The process 100 ends in step S108.

As described above, according to the process 100, when a listener inputs subjective data, that is, an impression representation language representing an impression the listener gets or wants to get when listening to music and a scene representation language representing a scene or state where the listener is listening to music, a piece of music that satisfies the impression and the scene or state represented by the input languages can be played back.

Thus, the listener is able to select and listen to a piece of music suitable for the feeling of the listener and the atmosphere at that moment. For example, when the listener wants to listen to upbeat music, the listener is able to listen to such music. In order to listen to a piece of music suitable for the feeling and atmosphere, the listener does not need to remember a title of a piece of upbeat music. Thus, even if the listener does not know a title of a corresponding piece of music or even if there are many corresponding pieces of music, the listener is able to listen to a piece of music that is suitable for the feeling at that moment.

Figure 6:
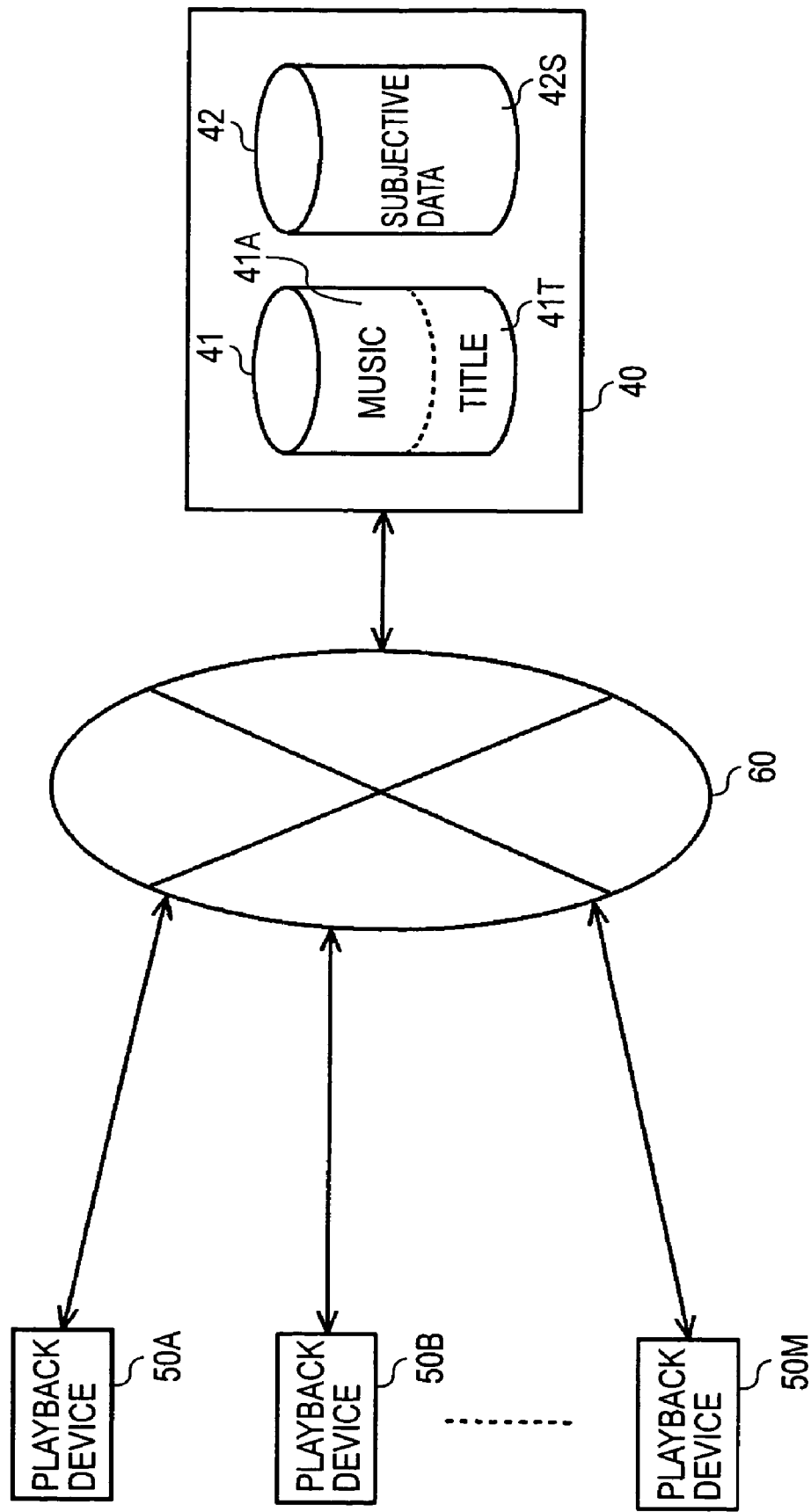
FIG. 6 is a schematic diagram showing an example of a server system.

FIG. 6 shows an example of a case where music and the subjective data table SBJT are stored in a database server 40 and the database server 40 is used via a network. In other words, in this example, two hard disk drives 41 and 42 are provided in the database server 40. The hard disk drive 41 stores a database 41A and a title database 41T. Files of music pieces 1 to N are stored as the database 41A, and the title database 41T, which corresponds to the title table TTBL, is provided for the music pieces 1 to N.

In addition, in the hard disk drive 42, a subjective data database 42S corresponding to the subjective data table SBJT is provided for the music pieces 1 to N stored in the database 41A. In this case, a tag recorded in each of the title database 41T and the subjective data database 42S is data designating a corresponding music piece in the database 41A, such as a start address of a file of a music piece.

Playback devices 50A to 50M are configured similarly to the above-described playback device 20. In addition, the playback devices 50A to 50M are connected to the database server 40 via a network 60.

Thus, by performing processing similar to the process 100 between the database server 40 and each of the playback devices 50A to 50M, a piece of music suitable for the feeling of a listener at that moment can be selected and played back.

Figure 7:
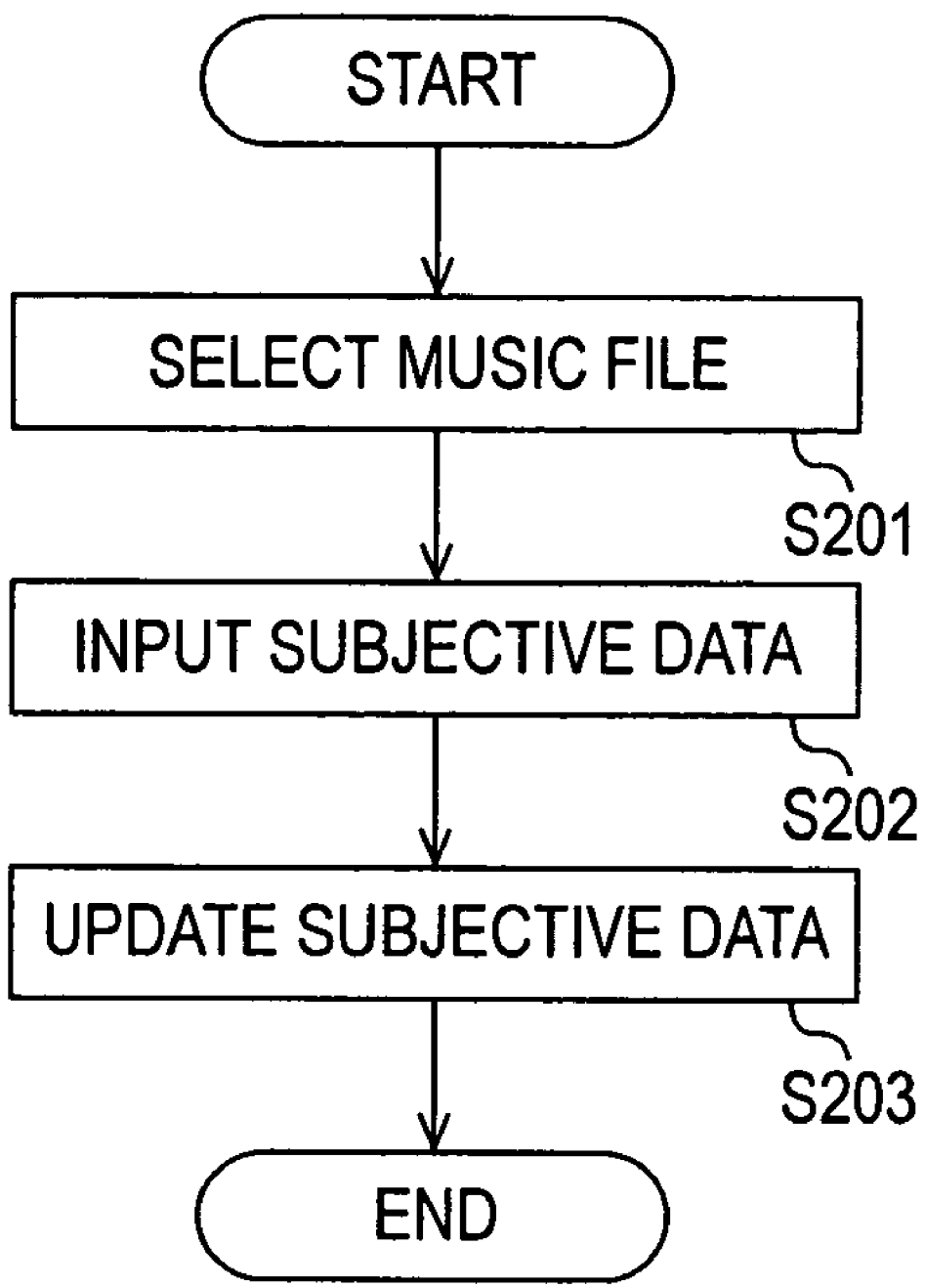
FIG. 7 is a flowchart showing an example of a data update process.

FIG. 7 shows a process to add or change subjective data in the subjective data database 42S of the database server 40. In other words, in this case, in step S201, a file of a piece of music for which subjective data is to be added or changed is selected. In step S202, subjective data for the piece of music selected in step S201 is input.

Then, in step S203, corresponding subjective data in the subjective data database 42S is updated using the subjective data input in step S202. For such updating, for example, labeling can be provided in accordance with a majority vote by a plurality of listeners.

Accordingly, participation of a plurality of listeners provides subjective data with statistical significance. Thus, more appropriate music selection can be achieved.

In addition, by performing similar processing on the subjective data table SBJT of the above-described playback device 20, unique subjective data can be achieved.

As described above, when digital audio data of a piece of music is data-compressed, the data size can be reduced to less than one tenth of its original size. Thus, when a piece of music is three minutes long, about 240 pieces of data-compressed music can be stored in a CD. In addition, much more pieces of music can be stored in a digital versatile disk (DVD).

Figure 8:
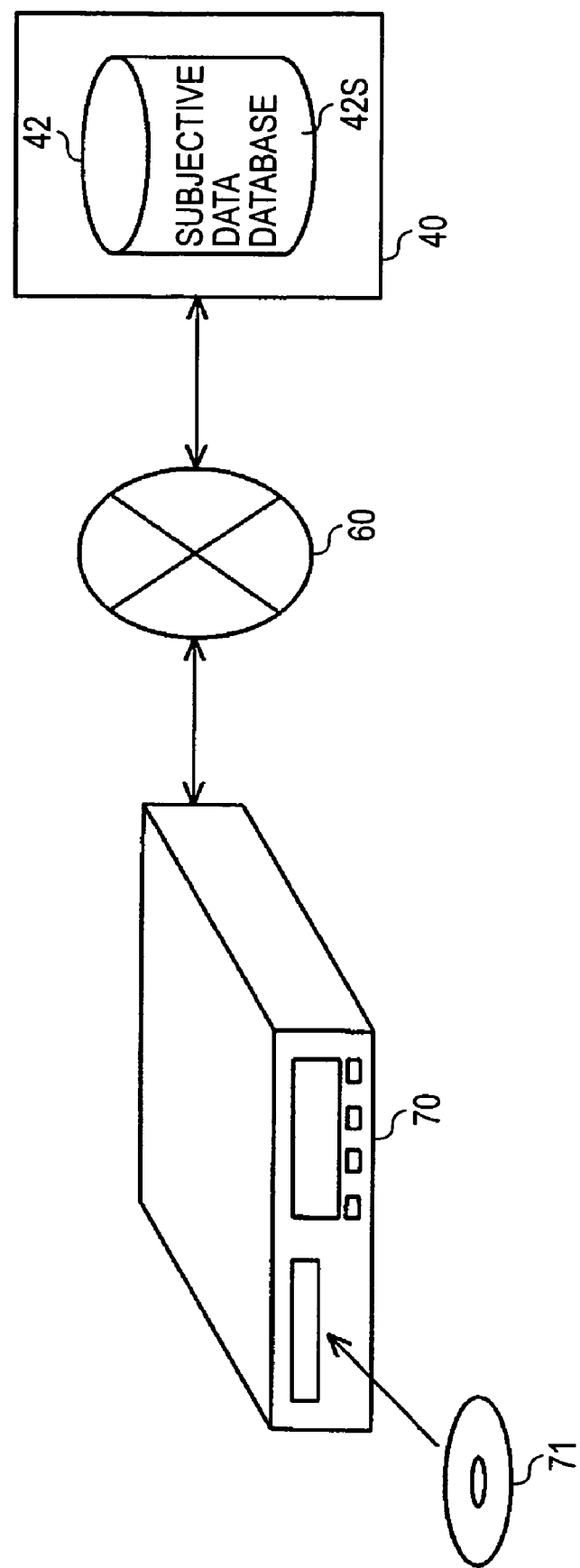
FIG. 8 is a schematic diagram showing another example of the server system.

FIG. 8 shows an example of a case where music is played back from a CD (or a DVD) by a dedicated player 70 and only the subjective data database 42S is provided in the database server 40. Pairs of subjective data and tags in the subjective data database 42S correspond to a plurality of pieces of music in a plurality of CDs. In addition, a tag includes, for example, a CD number and a track number.

Figure 9:
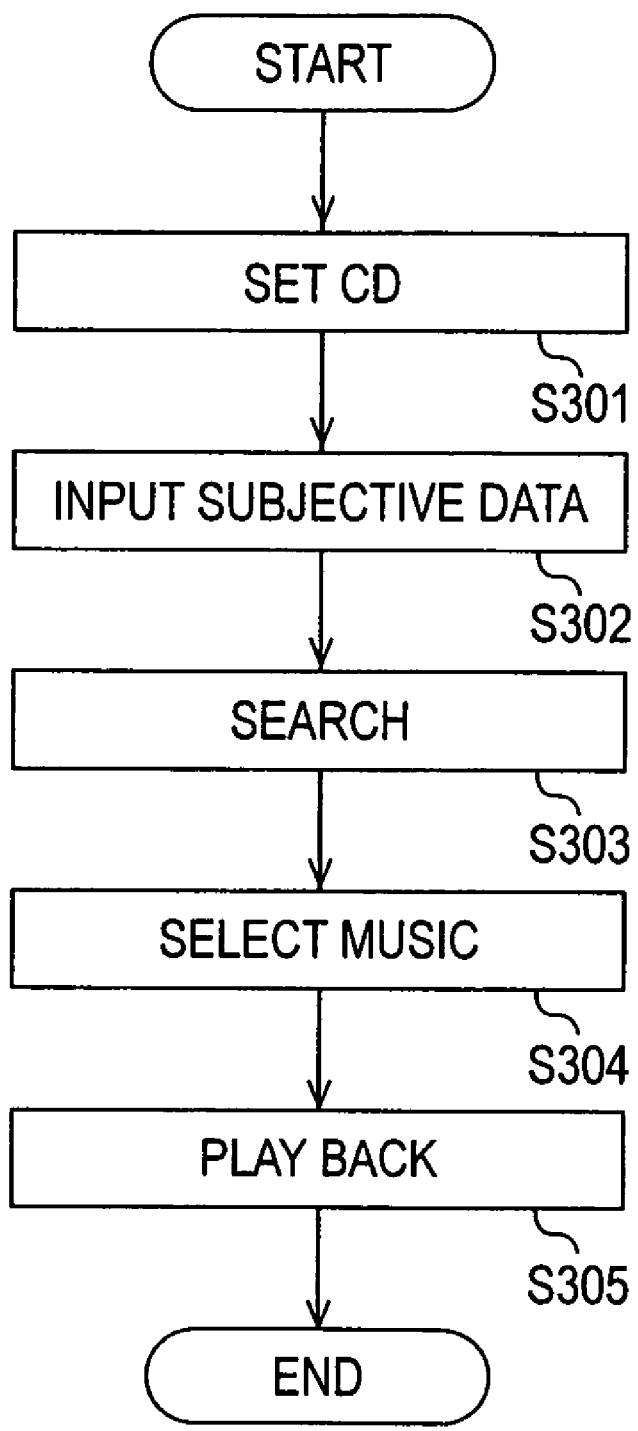
FIG. 9 is a flowchart showing an example of a playback process.

In this case, for example, a process shown in FIG. 9 is performed. In step S301, the CD 71 is set in the player 70. Then, data of a CD number is played back from the CD 71 and sent to the database server 40.

In step S302, subjective data is input by operating a key of the player 70. In step S303, the subjective data database 42S of the database server 40 is searched using the data input by step S302 as a search term, and a corresponding tag, that is, in this case, corresponding CD number and track number, is extracted.

In step S304, a track number included in the CD number of the CD 71 set in the player 70 is selected from among CD numbers and track numbers extracted in step S303, and the selected track number is sent to the player 70. As a result, in step S305, the player 70 plays back a piece of music corresponding to the track number selected and sent in step S304.

Figure 10:
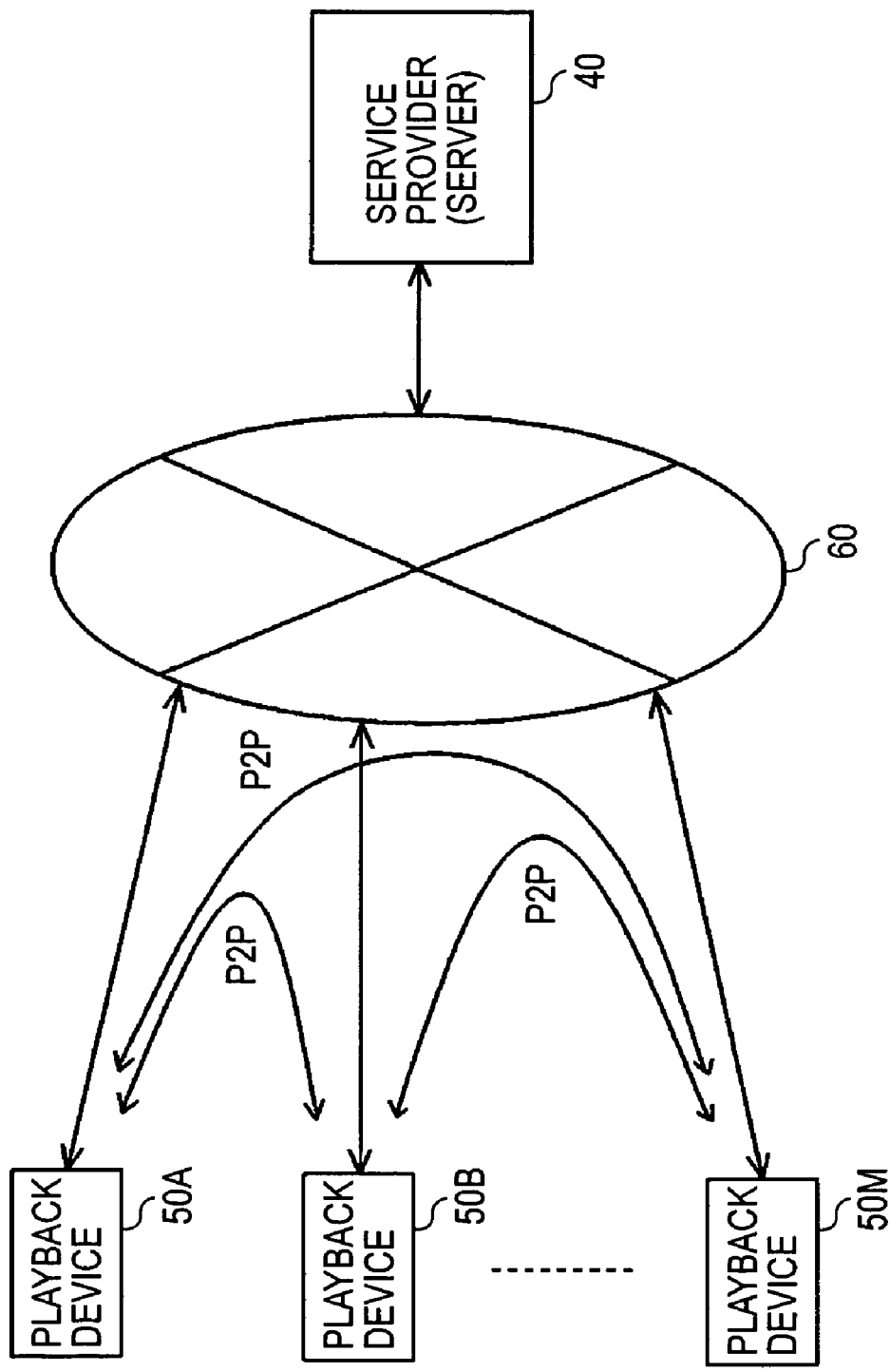
FIG. 10 is a schematic diagram showing another example of the server system.

FIG. 10 shows a case where subjective data can be exchanged between a plurality of listeners. In other words, the database server 40 and the playback devices 50A to 50M are connected to the Internet 60, and the database server 40 is provided, for example, by a label company. In this case, the label company serves as a service provider of subjective data and provides various sortable subjective data.

Thus, a listener is able to receive distribution of default subjective data from the database server 40 of the label company via the Internet 60 and to exchange subjective data with other listeners using a peer-to-peer (P2P) technology via the Internet 60.

In addition, the label company is capable of actively involving music, such as content, by analyzing subjective data provided by listeners.

Data of a file of a piece of music in the user area USRA may include fringe information, such as a title and a player, so that the title and the player can be displayed based on the fringe information when the data is played back.

In addition, although a case where impression representation languages and scene representation languages are prepared in advance and a language suitable for an image of music a listener wants to listen is selected from among the prepared languages when the listener selects a piece of music has been described, a language suitable for an image of music the listener wants to listen may be directly input and a piece of music corresponding to the input language may be selected. In this case, a synonym dictionary may be prepared so that a language input by the listener can be changed to a default language in accordance with the synonym dictionary.

In addition, data, such as the sex, age, occupation, and residential area of listeners targeted by a piece of music, may be added to subjective data in the subjective data table SBJT. In addition, the listener may be able to change or add subjective data. In addition, a tag associating a file of a piece of music in the user area USRA with subjective data in the subjective data table SBJT may be a file name or the like.

In addition, in a case where a plurality of pieces of music (a plurality of tags) is found in step S103 of the process 100 (FIG. 5), even if a listener does not designate a piece of music, the found plurality of pieces of music may be played back at random. In addition, a recording medium may be a DVD-R, a Blu-ray Disc™, a semiconductor memory, a magnetic tap, or the like. In addition, if data of music and fringe information are recorded in a CD Extra format or the like, the title table TTBL or the title database 42T are not necessary.

In addition, although a case where content to be played back is music (an audio signal) has been described, an image (a photograph or a computer graphics image), a picture (video or animation), or a game may be used as content to be played back. In addition, in the system shown in FIG. 10, if necessary, subjective data may be stored in a memory card so that the subjective data can be exchanged between listeners.

It should be understood by those skilled in the art that various modifications, combinations, sub-combinations and alterations may occur depending on design requirements and other factors insofar as they are within the scope of the appended claims or the equivalents thereof.

What is claimed is:

1. A data search device comprising:
   playback means for displaying to a user a plurality of first subjective data and second subjective data, each of the first subjective data being language representing a user input feeling of a predetermined content data and the second subjective data being language representing a scene at which the user listens to the predetermined content data, wherein each of the first subjective data and the second subjective data is stored in a storage in association with a tag that associates the first subjective data and the second subjective data with the predetermined content data;
   receiving means for receiving user input comprising a first word or phrase and a second word or phrase, the first word or phrase being first subjective data and the second word or phrase being second subjective data; and
   searching means for:
      determining whether the storage includes content data described by the received first word or phrase and the received second word or phrase by comparing the received first word or phrase and the received second word or phrase input by a user to entries of first subjective data and second subjective data in a subjective data table,
      when an exact match between the received first word or phrase and the received second word or phrase and an entry in the subjective data table is not identified, utilizing at least one synonym for at least one of the received first word or phrase and the received second word or phrase and comparing the at least one synonym to the entries,
      when a match between the received first word or phrase and the received second word or phrase or at least one synonym and an entry from the entries has been identified, extracting a tag associated with the entry, and identifying the content data using the tag associated with the entry.

2. A data search method comprising the steps of:
   receiving a user input comprising a first subjective data being language representing a user impression of a predetermined content data and a second subjective data being language describing an atmosphere at which a user listens to the predetermined content data;
   searching a plurality of content data stored on a recording medium for the predetermined content data based on the received first subjective data and the received second subjective data;
   when an exact match between the received first subjective data and the received second subjective data and data in the plurality of content data is not identified, utilizing at least one synonym for at least one of the received first subjective data and the received second subjective data and searching the plurality of content data for the predetermined content data based on the at least one synonym; and
   when the predetermined content data is identified in the plurality of content data based on the received first subjective data and the received second subjective data or based on the at least one synonym, playing back the predetermined content data from the recording medium on which the predetermined content data, the first subjective data and the second subjective data are recorded with a tag associating the first subjective data and the second subjective data with the predetermined content data.

3. A data search device comprising:
   a receiving unit for receiving a user input comprising a first subjective word or phrase representing an impression of a predetermined content data and a second subjective word or phrase representing a scene at which a user listens to or views the predetermined content data;
   a searching unit for searching a plurality of content data for the predetermined content data based on the received first subjective word or phrase and the received second subjective word or phrase received by the receiving unit, wherein, when an exact match between the received first subjective data and the received second subjective data and data in the plurality of content data is not identified, the searching unit utilizes at least one synonym for at least one of the received first subjective data and the received second subjective data and searches the plurality of content data for the predetermined content data based on the at least one synonym; and
   playback unit for playing back the predetermined content data from a recording medium on which the predetermined content data, the first subjective data and the second subjective data are recorded with a tag associating the first subjective word or phrase and the second subjective word or phrase with the predetermined content data when the searching unit identifies the predetermined content data in the plurality of content data based on the received first subjective word or phrase and the received second subjective word or phrase or based on the at least one synonym.

4. The data search device according to claim 3, wherein the searching unit converts a subjective word or phrase received by the receiving unit into a default language in accordance with a synonym dictionary.

* * * * *